(12) United States Patent
Jakubowski, Jr. et al.

(10) Patent No.: US 6,212,987 B1
(45) Date of Patent: Apr. 10, 2001

(54) AIRCRAFT STORE ADAPTOR

(75) Inventors: Thaddeus Jakubowski, Jr., St. Charles; John K. Foster, Florissant, both of MO (US)

(73) Assignee: The Boeing Company, St. Louis, MO (US)

( * ) Notice: Subject to any disclaimer, the term of this patent is extended or adjusted under 35 U.S.C. 154(b) by 0 days.

(21) Appl. No.: 09/216,474

(22) Filed: Dec. 18, 1998

Related U.S. Application Data

(63) Continuation-in-part of application No. 08/903,917, filed on Jul. 31, 1991, now abandoned.

(51) Int. Cl.$^7$ .................................................. B64D 1/06
(52) U.S. Cl. .................................................. 89/1.54
(58) Field of Search .................... 89/1.51, 1.53, 89/1.54, 1.58, 1.69

(56) References Cited

U.S. PATENT DOCUMENTS

| | | |
|---|---|---|
| 2,393,105 | 1/1946 | Hasselhorn . |
| 2,478,019 * | 8/1949 | Sonntag ................ 89/1.58 |
| 2,852,981 * | 9/1958 | Caya ................ 89/1.58 |
| 2,925,754 | 2/1960 | Fillman . |
| 3,268,188 | 8/1966 | La Roe et al. . |
| 3,367,233 * | 2/1968 | Silverschotz ................ 89/1.51 |
| 3,598,341 | 8/1971 | La Roe et al. . |
| 3,633,456 | 1/1972 | Carr et al. . |
| 3,677,506 | 7/1972 | La Roe . |
| 3,784,132 | 1/1974 | Newell . |
| 3,787,012 | 1/1974 | Jakubowski, Jr. . |
| 3,877,343 * | 4/1975 | Newell et al. ................ 89/1.51 |
| 3,887,150 | 6/1975 | Jakubowski, Jr. . |
| 3,898,909 | 8/1975 | Craigie . |
| 3,942,749 * | 3/1976 | Hasquenoph et al. ........... 244/137 R |
| 3,954,233 | 5/1976 | Hasquenoph et al. . |
| 4,120,232 | 10/1978 | Hoffman, Jr. . |
| 4,129,271 * | 12/1978 | Hasquenoph et al. ................ 244/137 |
| 4,148,451 * | 4/1979 | Schorr ................ 244/134 R |
| 4,168,047 * | 9/1979 | Hasquenoph et al. ........... 244/137 R |
| 4,257,639 | 3/1981 | Stock . |
| 4,395,003 | 7/1983 | Coutin . |
| 4,732,074 | 3/1988 | Normand . |
| 5,056,408 | 10/1991 | Joner et al. . |
| 5,363,737 | 11/1994 | Wallis . |
| 5,406,876 | 4/1995 | Harless et al. . |
| 5,583,312 | 12/1996 | Jakubowski, Jr. . |

FOREIGN PATENT DOCUMENTS

| | | | |
|---|---|---|---|
| 1065003 * | 5/1954 | (FR) | ................ 89/1.54 |
| 328662 * | 5/1930 | (GB) | ................ 89/1.58 |
| 404775 | 1/1934 | (GB) . | |
| 1414969 | 11/1975 | (GB) . | |
| 2182125 | 5/1987 | (GB) . | |
| 293144 | 2/1932 | (IT) . | |

* cited by examiner

*Primary Examiner*—Stephen M. Johnson
(74) *Attorney, Agent, or Firm*—Alston & Bird LLP

(57) ABSTRACT

An adaptor for releasably attaching a store to a rack on the underside of an aircraft. The rack has at least one hook connected to the rack and pivotable between a closed position for retaining the store on the rack and an open position for installation of the store on the rack and release of the store from the aircraft. The adaptor has a generally continuous lower surface shaped to conform to the outer surface of the store, an upper surface, and a surrounding wall connecting the upper and lower surfaces. The upper surface has a post extending downwardly from the rack for stabilizing the store against longitudinal and lateral movement of the store relative to the rack due to air loads during flight. The surrounding wall has a least one recess formed therein for receiving the hook. The adaptor is shaped so that upon release of the store, aerodynamic drag resulting from the presence of the adaptor on the store is minimized.

6 Claims, 5 Drawing Sheets

AIRCRAFT STORE ADAPTOR

This is a continuation-in-part of application Ser. No. 08/903,917, filed on Jul. 31, 1997, now abandoned.

TECHNICAL FIELD

This invention relates generally to adaptors for releasably attaching a store to an aircraft, and more particularly, to an adaptor having a faired outer surface.

BACKGROUND ART

Modern aircraft are designed to carry, release, and deliver on target a wide variety of weapons including bombs, missiles, rockets and other stores which are hung on the underside of the aircraft and must be quickly released in flight. Various types of suspension and release equipment are used to carry the stores and safely separate the stores from the aircraft.

Currently available suspension and release equipment interfaces with lugs (generally referred to as bail lugs) which have screw threaded shanks received in tapped cavities formed in the stores, and integrally formed suspension rings for receiving hooks extending from the aircraft or bomb rack for carrying the store. Since these rings are aligned longitudinally relative to the store and aircraft, the lugs restrain the store longitudinally but provide little lateral support, thus the store tends to oscillate laterally under the influence of lateral accelerations or other aerodynamic effects. The store therefore requires supports such as sway braces to prevent lateral movement of the lug and store. Typically, the sway braces add aerodynamic drag to the aircraft and increase the radar cross-section of the aircraft. After release of the store from the aircraft, the bail lugs impose a significant drag penalty on the store during its flight. Other types of lugs eliminate the need for sway braces but still project outward from the store surface and have a large frontal area which adds aerodynamic drag to the store and increases the radar cross-section of the store.

These lugs were designed when aerodynamic drag of the lug on the store and the impact of the lug on the radar cross-section of the store were not important factors. Today the drag effect of the lug on the store and the impact to radar cross-section are more important with the higher launching speeds of present day high-performance aircraft and sophisticated bomb and radar systems. Various retractable lug devices are available, however these devices are complex, expensive to manufacture and add significant weight to the stores.

Moreover, the screw threaded shank design of the bail lug adds weight to the store by requiring a cavity for receiving the shank, with sufficient material formed around the cavity to retain the threaded shank. The threaded shank also adds weight to the lug along with machining costs. Furthermore, the cavity may compromise the functionality of certain stores and reduce their effectiveness.

DISCLOSURE OF INVENTION

The aircraft store adaptor of the present invention overcomes the deficiencies of the prior art by providing an adaptor which provides a lightweight, low volume design for releasably attaching a store to an aircraft and allows for minimum spacing between the store and the aircraft. Among the features of the present invention may be noted the provision of an aircraft store adaptor which positively and firmly retains the store, yet permits for rapid release of the store. The present invention overcomes the limitations of the prior art designs and provides a lightweight, non-complex adaptor which minimizes aerodynamic drag and radar cross-section of the aircraft and store, and which is reliable, economical to manufacture, and easy to install.

Generally, an adaptor of the present invention is for releasably attaching a store to a rack on the underside of an aircraft. The rack has at least one hook connected thereto pivotable between a closed position for retaining the store on the rack and an open position for installation of the store on the rack and for release of the store from the aircraft. The adaptor comprises a body having a generally continuous lower surface shaped to conform to the outer surface of the store, an upper surface, and a surrounding wall connecting the upper and lower surfaces. The upper surface has an opening formed therein for receiving a post extending downwardly from the rack for stabilizing the store against longitudinal and lateral movement of the store relative to the rack due to air loads during flight. The surrounding wall has at least one recess formed therein for receiving the hook. The adaptor is shaped so that upon release of the store, aerodynamic drag resulting from the presence of the adaptor on the store is minimized.

Other objects and features will be in part apparent and in part pointed out hereinafter.

BRIEF DESCRIPTION OF DRAWINGS

Corresponding reference characters indicate corresponding parts throughout the several views of the drawings.

Best Modes for Carrying out the Invention

Figure 1:
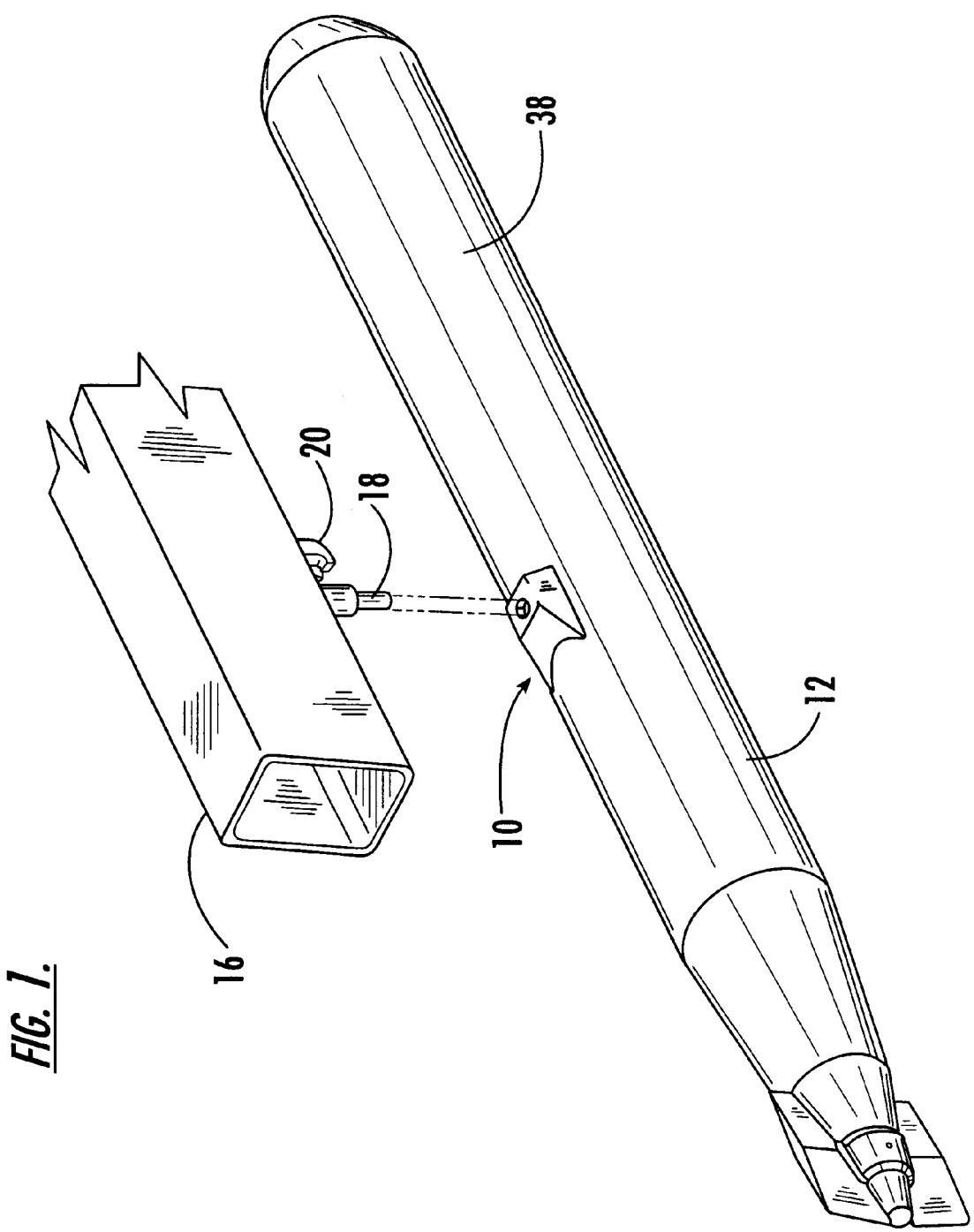
FIG. 1 is an exploded view of an adaptor attached to a store, and a rack for attaching the store to an aircraft.

Referring now to the drawings, and first to FIG. 1, an adaptor for releasably attaching a store 12 to an aircraft is generally indicated at 10. The adaptor 10 is shown mounted on a bomb 12, but may be used to attach a missile, rocket or any other weapon or store to an aircraft. The adaptor 10 serves to suspend the store 12 from a rack 16 on the underside of an aircraft. It is to be understood that the store 12 may be suspended by the adaptor 10 by mounting it directly to the aircraft with the aircraft structure forming the rack. The underside of the aircraft may also be an enclosed area such as an internal weapon bay. The adaptor 10 may be used for external pylon weapon carriage of stores, internal weapon carriage of stores, conformal and tangential external weapon carriage of stores, and external weapon carriage of stores from multiple ejector racks, as is well known by those skilled in the art. The adaptor 10 may also be used to attach stores 12 to helicopters or other types of vehicles.

The rack 16 (or aircraft structure) includes at least one hook 20 pivotally connected to the rack for pivoting between a closed position for retaining the store 12 on the rack and an open position for installation of the store on the rack and release of the store from the aircraft. At least one ejector piston 18 extends down from the rack 16 for ejecting the store 12 from the rack, as described below. The rack 16 may also have one or more drag posts extending down from the rack for engagement with one or more adaptors 10 to prevent movement of the adaptor relative to the rack.

Figure 2:
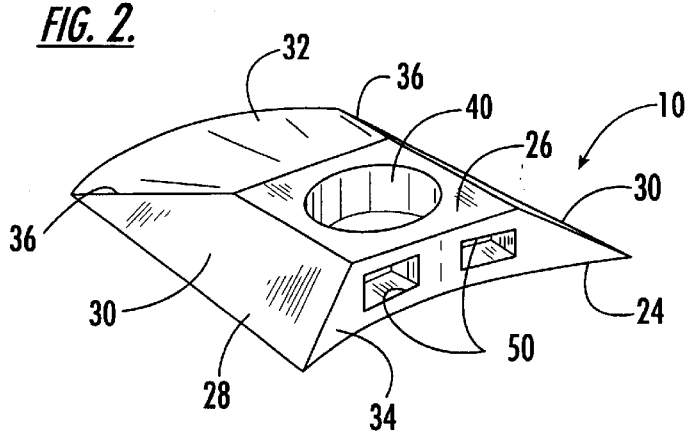
FIG. 2 is a perspective view of the adaptor of FIG. 1.

The outer surface of the adaptor 10 is shaped in the form of a fairing to produce a smooth outline and reduce drag on the store 12 (FIGS. 1 and 2). The adaptor 10 comprises a body having a generally continuous lower surface 24, an upper surface 26, and a surrounding wall 28 connecting the upper and lower surfaces. The surrounding wall 28 comprises two opposing sidewalls 30 having generally the same trapezoidal shape, a front wall 32 and a rear wall 34. The adaptor 10 is shaped to minimize the aerodynamic drag on the store 12 after release from the aircraft so that the adaptor does not interfere with the flight of the store, minimize the impact of the adaptor on the radar cross-section of the store to prevent the store 12 from being picked up on radar, or minimize both aerodynamic drag and radar cross-section.

Figure 5:
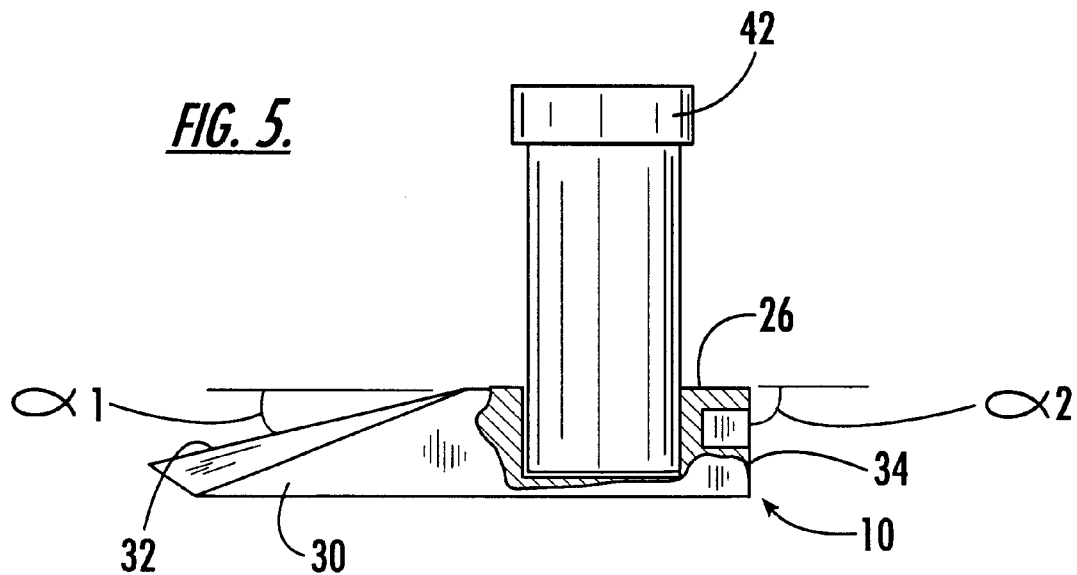
FIG. 5 is a side view of the adaptor of FIG. 2 with a drag post engaged with the adaptor and parts broken away to show detail.

The distance between the lower and upper surfaces 24, 26 is designed to be as small as possible to allow the store 12 to be carried close to the aircraft to reduce the effect of drag on the aircraft due to the store prior to releasing the store. The front wall 32 is designed to provide a smooth interface between the store 12 and the adaptor 10 and provide angles and edges as desired between the store and adaptor to meet radar cross-section and aerodynamic requirements. The angle $\alpha_1$ formed between the front wall 32 and a plane passing through the upper surface 26 of the adaptor 10 is preferably smaller than an angle $\alpha_2$ formed between the rear wall 34 and the plane to provide a smooth transition between the front wall of the adaptor and the store 12 (FIGS. 1 and 5). The front wall 32 may be formed as a concave, convex or flat surface relative to side edges 36 of the front wall (FIG. 2).

It is to be understood that the overall shape of the adaptor 10 may be different than the shape shown, as long as the adaptor is configured to minimize aerodynamic drag on the store 12 or the radar cross-section of the adaptor. For example, the shape of the front wall 32, rear wall 34 and sidewalls 30 may be different and the angle $\alpha_1$ between the upper surface 26 and front wall and the angle $\alpha_2$ between the upper surface and rear wall may be other than shown without departing from the scope of the invention. The body is preferably substantially solid to provide adequate strength to support the store 12. The adaptor 10 may also be formed as a hollow body for carrying lightweight stores 12.

The lower surface 24 of the adaptor 10 is generally continuous and shaped to conform to the outer surface of the store 12 so that the adaptor can be mounted directly on the outer surface of the store (FIGS. 1 and 2). The adaptor 10 is preferably welded directly onto the outer surface of the store 12 to provide a strong permanent connection between the store and the adaptor. The welding of the adaptor 10 to the store 12 eliminates the need for any holes to be formed in an outer shell 38 of the store. The adaptor 10 may also be bonded to the store 12 by adhesives, fusion bonding or any other suitable method or may be fabricated along with the outer shell 38 of the store 12. For example, the adaptor 10 may be integrally cast onto the outer shell 38 of the store 12 during casting of the shell. Fasteners (not shown) may also be used to connect the adaptor 10 to the store 12. The adaptor 10 may be formed from a metal such as steel, a polymeric material, a composite material, or any other suitable material. The material of the adaptor 10 is preferably selected to be compatible with the material of the store 12 so that corrosion does not form between the store and adaptor. However, if there is to be only one adaptor 10 on the store 12, it is necessary that the ejection piston 18 or sleeve 44 mates with opening 40 in a snug, close-fitting relationship. This is necessary so that the store 12 does not slide-off the rack 16 and hook 20 assembly prematurely. Providing such a close-fitting relationship eliminates the prior art need for more than one hook/adaptor per store. The prior art required at least two hook/adaptor assemblies per store. This is because a prior art ejection piston was in loose relation to an adaptor opening, thus requiring two opposing hook assemblies to prevent the store from prematurely sliding off a rack. This close-fitting relationship provides the further benefit of reducing sway between the store and rack.

Figure 3:
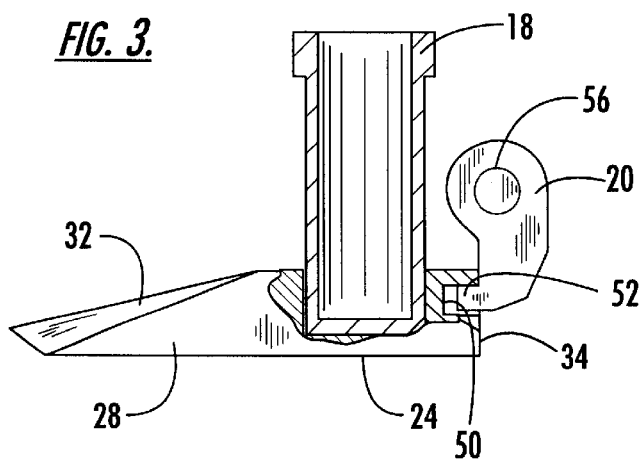
FIG. 3 is a side view of the adaptor of FIG. 2 with an ejector piston and hook engaged therewith, parts being broken away to show detail.
Figure 6:
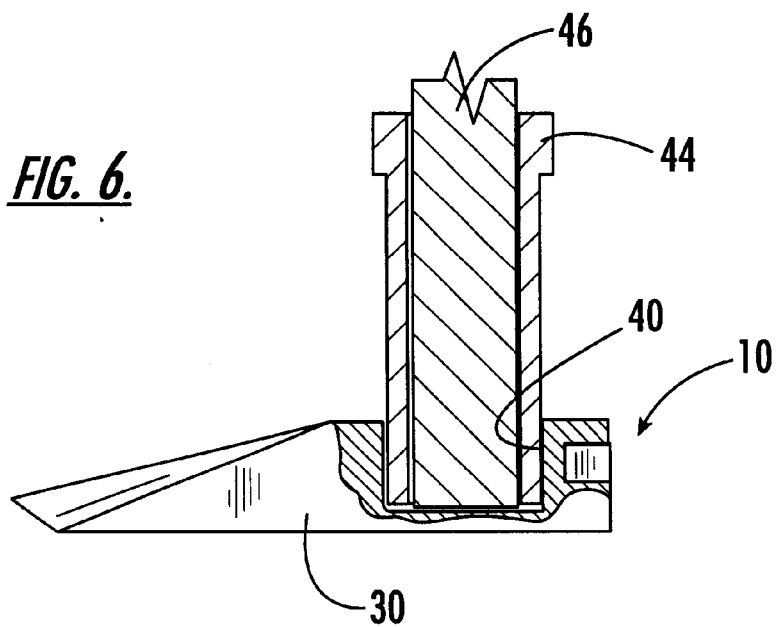
FIG. 6 is a side view of the adaptor of FIG. 2 with an ejector piston and drag post engaged with the adaptor with parts broken away and shown in section.

The upper surface 26 of the adaptor 10 has a generally cylindrical opening 40 formed therein for receiving a cylindrical post extending downwardly from the rack 16 for stabilizing the store 12 against longitudinal and lateral movement of the store relative to the rack due to air loads during flight. The post may be the ejector piston 18 which fits within the opening 40 and is downwardly engageable with the adaptor 10 for forcing the store 12 away from the aircraft (FIGS. 1 and 3). The piston is moved by hydraulic, pneumatic or pyrotechnic pressure, for example. The force of the ejector piston 18 against the adaptor 10 propels the adaptor and attached store 12 downwardly so that they quickly clear the aircraft carrying them. The ejector piston 18 may also be located adjacent to the adaptor 10 so that it engages the outer surface of the store 12 rather than the adaptor, to force the store away from the aircraft. In place of the ejector piston 18, a drag post 42 may be inserted into the opening 40 to prevent lateral movement of the store 12 relative to the rack 16 (FIG. 5). The drag post may also be formed as a sleeve 44 for receiving an ejector piston 46 so that both a drag post and an ejector piston can be inserted into the opening 40 in the adaptor 10 (FIG. 6). It is to be understood that the shape and size of the opening 40 may vary to correspond to different ejector pistons 18, 46 or drag posts 42, 44. Sway braces (not shown) may also be used to provide additional lateral support between the store 12 and the aircraft.

Figure 4:
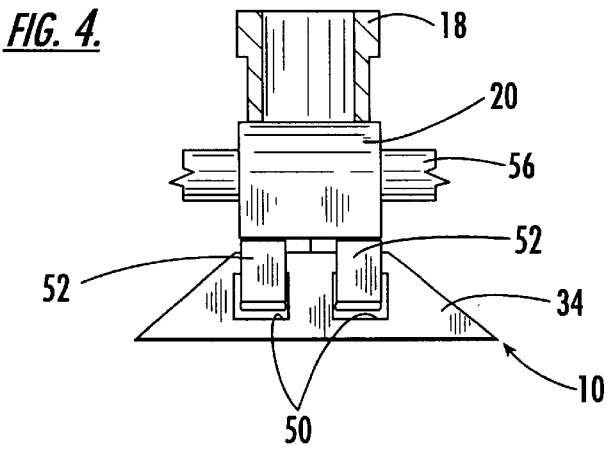
FIG. 4 is a rear view of the adaptor, ejector piston and hook of FIG. 3.

The rear wall 34 of the adaptor 10 preferably extends generally perpendicular to the upper surface 26 of the adaptor 10 and has recessing formed therein for receiving the hook 20 (FIGS. 2 and 3). The recessing consists of two openings, each designated 50, for receiving two fingers 52 of the hook 20. (FIG. 4). The openings 50 are preferably rectangular to provide for easy machining. The recessing may have other configurations, such as the one shown in FIG. 9 and described below, without departing from the scope of the invention.

In order to release the adaptor 10 and its attached store 12, the hook 20 is allowed to rotate around a pivot pin 56. This is accomplished by moving linkages (not shown) connected to the hook 20. As the hook 20 rotates, the fingers 52 of the hook disengage from the adaptor 10 and allow it and the attached store 12 to drop. Although the adaptor 10 and store 12 would normally fall away from the aircraft when released, it is often important to assure that the store will be positively ejected, and with a substantial velocity. If only gravity is relied upon, the store 12 may bang against the aircraft when left to the large aerodynamic forces encountered at high speeds, and it may be difficult to drop the store accurately or assure that it will fall on a desired target. Accordingly, the ejector piston 18, 46 is provided to eject the adaptor 10 and store 12 positively. The actuating mechanisms for the hook 20 and ejector pistons 18, 46 are synchronized so that the hook 20 releases the adaptor 10 before the piston forces the store 12 downwardly.

Figure 7:
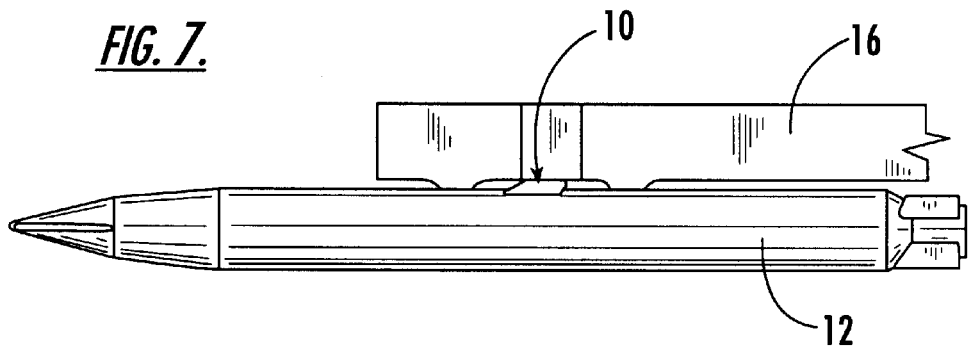
FIG. 7 is a side view of the adaptor and store of FIG. 1 connected to the rack.

A store 12 and adaptor 10 system of the present invention may include only one adaptor for releasably attaching the store to the aircraft (FIG. 7). The aircraft may have one ejector piston 18 extending into the opening 40 in the adaptor 10 or two ejector pistons, one located forward of the front wall 32 of the adaptor and one located rearward of the rear wall 34 of the adaptor (FIGS. 3 and 7). The use of one adaptor 10 reduces the overall weight of the store 12 and adaptor system. This arrangement can be used on small diameter, lightweight stores 12, such as a store weighing less than about 500 lbs. (226.8 kg) and having a diameter of less than about 8.0 in. (16.5 cm.), for example.

Figure 8:
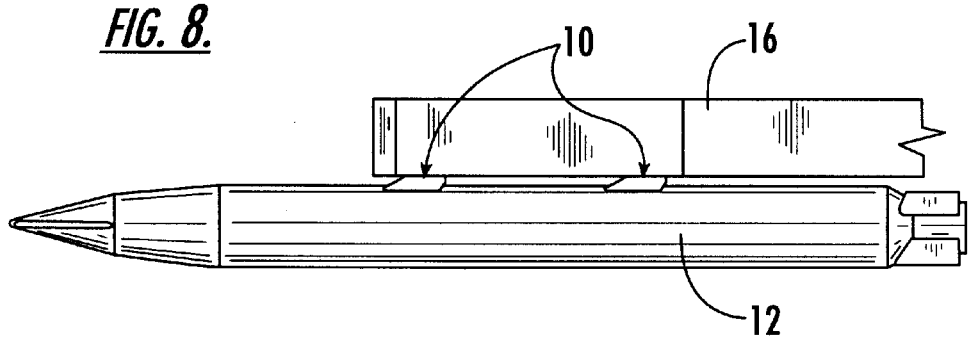
FIG. 8 is a side view showing two adaptors connected to the store and rack of FIG. 1.

The store 12 and adaptor 10 system may also include two or more adaptors (FIG. 8). The aircraft may have two ejector pistons 18 for engagement with the openings 40 formed in the upper surface 26 of each adaptor 10 or the ejector pistons may be positioned on the rack 16 for direct engagement with the store 12 (FIGS. 3 and 7). Various combinations of adaptors 10, ejector pistons 18, 46 and drag posts 42, 44 may be used.

Figure 9:
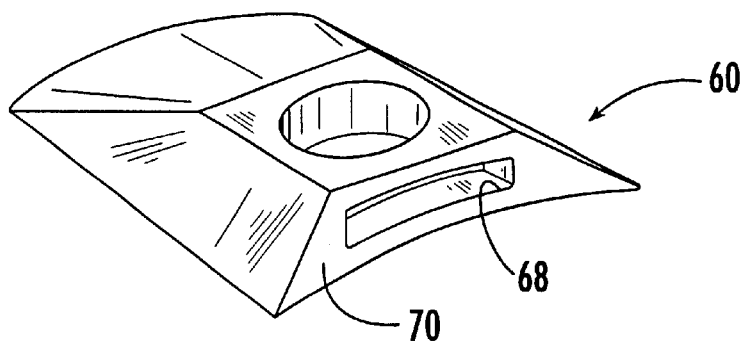
FIG. 9 is a perspective view of an adaptor of a second embodiment of the present invention.

A second embodiment of the adaptor of the present invention is shown in FIG. 9, and generally indicated at 60. The adaptor 60 is similar to the adaptor 10 of the first embodiment except that a single opening or recess 68 is formed in the rear wall 70 for receiving the hook 20. The number of openings 68 and the shape of the opening may vary to correspond to different types of hooks 20.

Figure 10:
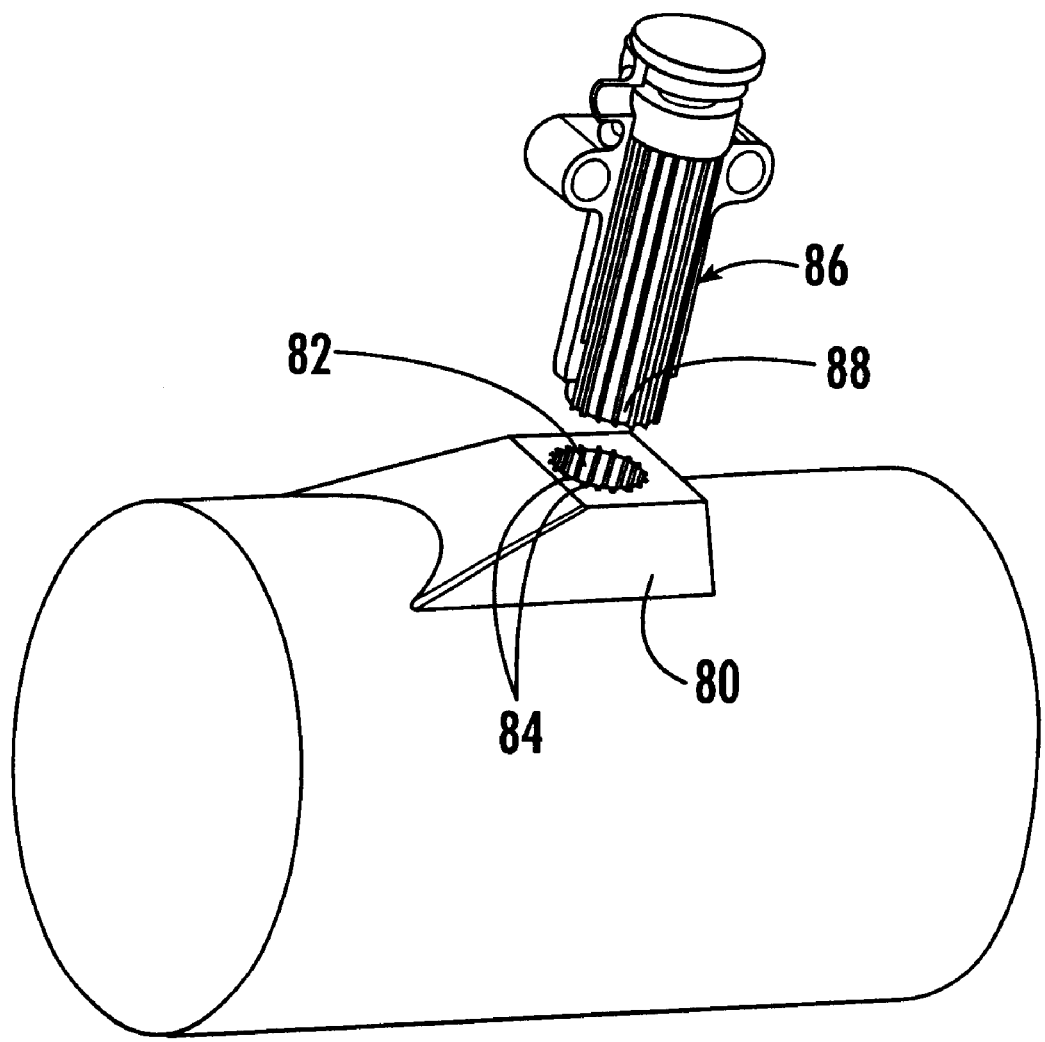
FIG. 10 illustrates another embodiment of the present invention.

FIG. 10 illustrates another embodiment of the present invention. An adaptor 80 includes an opening 82 presenting splines 84. An ejector piston 86 has indentations (shown generally at 88) such that ejector piston 86 is in a close-fitting relationship with opening 82. The splines 84 act to significantly reduce any yaw (rotation) that might otherwise be experienced by a store when attached to a rack.

It will be observed from the foregoing that the aircraft store adaptor 10, 60 of this invention has numerous advantages. Importantly, the adaptor 10, 60 provides a compact, non-complex, lightweight design which is easily attached to the store 12 without impact to the design of the store. Furthermore, the adaptor 10, 60 minimizes aerodynamic drag on the store 12 and the radar cross-section of the store during flight after its release from the aircraft.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An adaptor in combination with a store and a rack for releasably attaching the store to the rack on the underside of an aircraft, the rack having a hook that is pivotable between a closed position for retaining the store on the rack and an open position for installation of the store on the rack and release of the store from the aircraft, the rack also having an outwardly extending post having a plurality of indentations, the adaptor comprising:

a lower surface shaped to conform to an outer surface of the store;

an upper surface defining an opening for receiving the post extending from the rack, said opening having a shape complimentary to the post in that the portion of the upper surface that defines the opening includes a plurality of splines for engaging corresponding indentations defined by the post such that yaw motion of the adaptor and store is substantially eliminated; and a surrounding wall defining a recess for receiving the hook.

2. An adaptor according to claim 1, wherein the post is a drag post.

3. An adaptor according to claim 1, wherein the post is an ejector piston.

4. An assembly in combination with a rack for releasably attaching a store to the rack on the underside of an aircraft, the rack having a hook that is pivotable between a closed position for retaining the store on the rack and an open position for installation of the store on the rack and release of the store from the aircraft, the rack also having an outwardly extending post having a plurality of indentations, the assembly comprising:

a store; and a single adaptor having a lower surface shaped to conform to an out surface of the store, and an upper surface defining an opening therein for receiving the post extending from the rack, said opening having a shape complimentary to the post in that the portion of the upper surface that defines the opening includes a plurality of splines for engaging corresponding indentations defined by the post such that yaw motion of the adaptor and store is substantially eliminated, and a surrounding wall defining a recess therein for receiving the hook.

5. An assembly according to claim 4, wherein the post is a drag post.

6. An assembly according to claim 4, wherein the post is an ejector piston.

\* \* \* \* \*